(12) United States Patent
Wechlin

(10) Patent No.: US 9,776,516 B2
(45) Date of Patent: Oct. 3, 2017

(54) DEVICE FOR INDUCTIVE TRANSFER OF ELECTRICAL ENERGY

(71) Applicant: CONDUCTIX-WAMPFLER GMBH, Weil am Rhein (DE)

(72) Inventor: Mathias Wechlin, Kandern (DE)

(73) Assignee: CONDUCTIX-WAMPFLER GMBH, Weil am Rhein (DE)

( * ) Notice: Subject to any disclaimer, the term of this patent is extended or adjusted under 35 U.S.C. 154(b) by 336 days.

(21) Appl. No.: 14/402,378

(22) PCT Filed: Feb. 1, 2013

(86) PCT No.: PCT/EP2013/052019
§ 371 (c)(1),
(2) Date: Nov. 20, 2014

(87) PCT Pub. No.: WO2013/174527
PCT Pub. Date: Nov. 28, 2013

(65) Prior Publication Data
US 2015/0084426 A1  Mar. 26, 2015

(30) Foreign Application Priority Data
May 21, 2012  (DE) .................. 10 2012 104 372

(51) Int. Cl.
*H01F 37/00* (2006.01)
*H01F 38/14* (2006.01)
(Continued)

(52) U.S. Cl.
CPC ............. *B60L 11/18* (2013.01); *B60L 11/182* (2013.01); *H01F 38/14* (2013.01); *H02J 5/005* (2013.01);
(Continued)

(58) Field of Classification Search
CPC ........ B60L 11/18; B60L 11/182; H01F 38/14; H02J 5/005; H02J 50/00; H02J 50/10;
(Continued)

(56) References Cited

U.S. PATENT DOCUMENTS 2,247,936 A  7/1941  Bishop
4,942,352 A  7/1990  Sano
(Continued)

FOREIGN PATENT DOCUMENTS

DE        639041 C      11/1936
DE        8333364 U1     5/1984
(Continued)

OTHER PUBLICATIONS

German Office Action with English translation dated Jul. 26, 2016, 24 pages (with machine English translation).
(Continued)

*Primary Examiner* — Hal Kaplan
(74) *Attorney, Agent, or Firm* — Paul D. Bianco; Stephen Bongini; Fleit Gibbons Gutman Bongini & Bianco PL

(57) ABSTRACT

A device for the inductive transfer of electrical energy between a stationary coil, which can be installed in a roadway, and a secondary coil of a movable electrical load, in particular of an electrical vehicle, wherein a supply unit for supplying electrical energy is allocated to the coil. The problem of providing a maintenance-friendly, reliable, operationally secure device for inductive transfer of electrical energy, which is protected against penetration of water into the sensitive electronics, is solved in that the supply unit is arranged on a side of the coil facing away from the roadway in an installed state in a housing which is closed on top and laterally, having a housing opening open to the bottom.

20 Claims, 1 Drawing Sheet

(51) Int. Cl.
*B60L 11/18* (2006.01)
*H02J 50/00* (2016.01)
*H02J 50/10* (2016.01)
*H02J 5/00* (2016.01)

(52) U.S. Cl.
CPC .............. *H02J 50/00* (2016.02); *H02J 50/10* (2016.02); *Y02T 10/7005* (2013.01); *Y02T 10/7072* (2013.01); *Y02T 90/122* (2013.01); *Y02T 90/14* (2013.01)

(58) Field of Classification Search
CPC ............ Y02T 10/7005; Y02T 10/7072; Y02T 90/122; Y02T 90/14
USPC ........................................................ 307/104
See application file for complete search history.

(56) References Cited

U.S. PATENT DOCUMENTS

| | | | |
|---|---|---|---|
| 5,722,204 | A | 3/1998 | Stieb et al. |
| 6,219,267 | B1 | 4/2001 | Andres |
| 6,265,659 | B1* | 7/2001 | Kaiser ................ B60R 16/0239 174/50.51 |
| 6,859,126 | B2 | 2/2005 | Iwao et al. |
| 8,679,660 | B2* | 3/2014 | Kawai ................ H01G 9/0003 429/120 |
| 2003/0052764 | A1 | 3/2003 | Iwao et al. |
| 2004/0005809 | A1 | 1/2004 | Suzuki |
| 2012/0119699 | A1 | 5/2012 | Carbunaru et al. |
| 2012/0256586 | A1 | 10/2012 | Becker |
| 2012/0261482 | A1 | 10/2012 | Vollenwyder et al. |

FOREIGN PATENT DOCUMENTS

| | | |
|---|---|---|
| DE | 33 22 584 | 11/1984 |
| DE | 29502938 U1 | 4/1995 |
| DE | 103 23 357 | 12/2003 |
| DE | 69724995 | 7/2004 |
| DE | 102008009649 A1 | 9/2008 |
| DE | 10 2009 057 437 | 6/2011 |
| DE | 102009057437 A1 | 6/2011 |
| DE | 10 2011 116 738 | 4/2013 |
| DE | 102011116738 A1 | 4/2013 |
| EP | 357829 | 3/1990 |
| EP | 1 293 996 | 3/2003 |
| EP | 2196351 A1 | 6/2010 |
| FR | 2695285 | 3/1994 |
| FR | 2 732 169 | 9/1996 |
| FR | 2 765 735 | 1/1999 |
| GB | 2477080 | 7/2011 |
| WO | 9827561 | 6/1998 |

OTHER PUBLICATIONS

English translation of Written Opinion published Nov. 21, 2014 for PCT/EP2013/052019.
English translation of International Preliminary Report on Patentability dated Nov. 25, 2014 for PCT/EP2013/052019.
International Search Report dated Jul. 31, 2013 for PCT/EP2013/052019.
Third Party Observation, dated Aug. 22, 2014 for PCT/EP2013/052019.
English translation of International Search Report dated Jul. 31, 2013 for PCT/EP2013/052019.

* cited by examiner

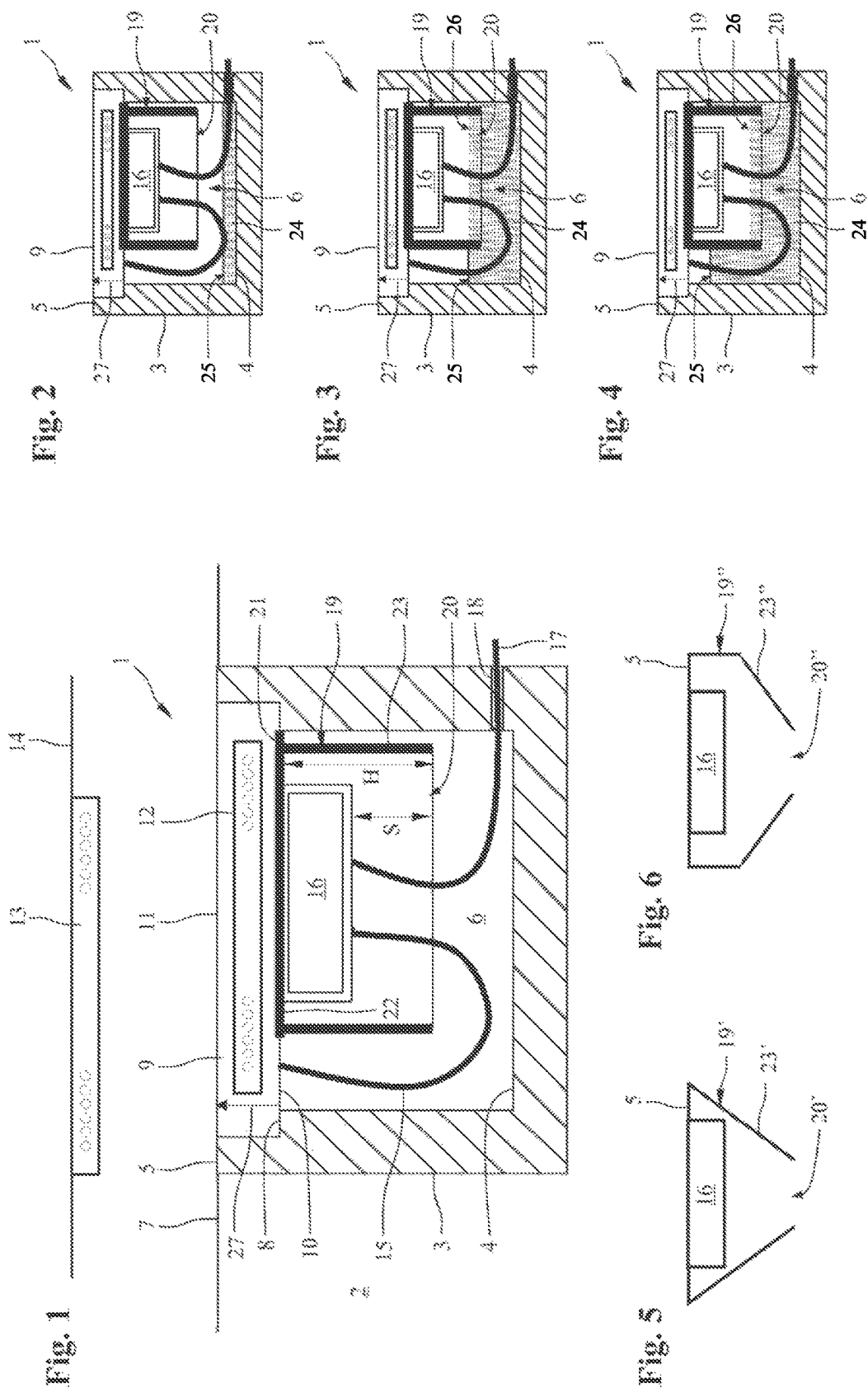

DEVICE FOR INDUCTIVE TRANSFER OF ELECTRICAL ENERGY

FIELD OF THE INVENTION

The invention relates to a device for the inductive transfer of electrical energy.

BACKGROUND OF THE INVENTION

DE 697 24 995 T2 discloses a device according to the class in the form of an electrical power supply system that has a portable power socket unit with a power socket and a secondary coil connected to this power socket. To be able to supply electrical energy to the portable unit via the secondary coil, a base unit is fixed in position, submerged in a drainage shaft in the roadway. The base unit has a primary coil for the inductive transfer of electrical energy to the secondary coil of the portable power socket unit and also electronics supplying the primary coil with electrical energy. The primary coil and the electronics are held in a housing that is sealed against the penetration of water. The electronics are connected to the power supply grid via a grid supply line that is fed through a bushing provided in the housing. To prevent the penetration of water into the inner space of the housing through the bushing, the bushing has a special seal.

The power socket unit described above has the disadvantage that the seal of the bushing is a possible leakage point if, for example, the seal becomes damaged due to vibrations or small animals under the ground. The sealing effect of the seal can also degrade after a certain amount of time; for example, the sealing material can become porous over time, so that this also poses the risk of allowing water penetration. To prevent this as much as possible, the seal must be inspected regularly, which is possible only with great effort. To do this, the cover of the housing must be removed and then the heavy coil and the sensitive electronics must be removed. Only then is the bushing sufficiently exposed that its leak-tightness can be tested. If the seal has become leaky, the ground above the seal must be excavated to allow the seal to be replaced from the outside of the housing.

In the area of inductive energy transfer to movable loads, for example, electric vehicles such as automobiles or trucks, there is the problem that the area around the submerged primary coil is often exposed to vibrations due to vehicles regularly driving over the ground, and this also applies a load on the seal.

GB 2477080 A discloses a rail track for track vehicles with a prefabricated track module in which the cable of a primary coil is laid between two running rails, extending in the longitudinal direction of the running rails. Laterally next to the running rails there are electrical or electronic components arranged in a box section. A passage hole runs out from the box section into the area between the rails, wherein lines for connecting the cable to the electrical or electronic components lead through the passage hole. Because the ground between the running rails is above the ground of the box section, and the electrical or electronic components are arranged on the ground of the box section, water penetrating into the box section or the area between the running rails collects in the lower-lying box section. To protect the electrical or electronic components from water, these components must be sealed in an appropriate watertight manner. These are connected with relatively great effort, because the lines going out from the components must have special seals.

SUMMARY OF THE INVENTION

Embodiments of the invention can overcome the disadvantages mentioned above and provide a device named above for the inductive transfer of electrical energy, which is maintenance friendly, reliable, operationally safe, and protected against the penetration of water into the sensitive electronics.

Advantageous construction and preferred refinements of the invention are also disclosed.

According to the invention, the device named above for the inductive transfer of electrical energy is characterized in that the supply unit is arranged on a side of the coil facing away from the roadway in an installed state in a housing that is closed on top and laterally, having a housing opening that is open to the bottom. In this way, according to the diving bell principle, water can penetrate into the housing only so far until the water pressure reaches equilibrium with the pressure of the air enclosed in the housing, or possibly also another gaseous fluid. The references to water here and below also include the possibility of other fluids. Thus, contrary to the opinion of those skilled in the art, penetration of water or other fluids can be reliably prevented while eliminating additional and expensive sealing measures.

In one advantageous refinement of the invention, the supply unit can be arranged in the housing in the height direction with a safety margin above the housing opening, wherein advantageously the safety margin is at least half as high, preferably more than half as high, as a distance between the housing opening and an upper housing cover of the housing opposite the housing opening. This ensures that the air in the housing is sufficient to withstand the water pressure of the penetrating water.

Preferably, a side housing wall of the housing can narrow at least in some sections toward the housing opening, wherein a level of penetrating water rises slower and slower, because the space of the housing becomes bigger and bigger with height. Preferably, in alternative refinements, the housing can have the shape of a hollow conical section that is closed on one side, wherein the smaller side of the hollow cone forms the housing opening, or the housing has the shape of a hollow cylinder that is closed on one side. Other shapes are also conceivable, for example, the housing can have an angular shape in cross section, for example, square, rectangular, hexagonal, octagonal, or polygonal, preferably rectangular.

Advantageously, the housing can be made from an electrically conductive material in order to shield the electronics contained in the supply unit from the strong magnetic field of the primary coil.

Advantageously, the housing could also be made from a non-corroding material, so that the housing can be produced easily, is lightweight, and is protected against corrosion. Preferably, a hard plastic material can be used.

In one preferred refinement of the invention, a ventilation device could be provided outside the housing for venting an inner space of the device, in order to exhaust air from the inner space to the outside of the housing and to be able to drain the water out of the inner space in the event the device is completely flooded and a flow of water continues to press against the device.

Preferably, the supply unit could be arranged on an upper housing cover of the housing opposite the housing opening, which further simplifies the mounting of the supply unit on the housing.

In one design that is advantageous with regard to production and for installation on-site, the coil could be integrated in a coil unit, in particular, cast in concrete or steel-reinforced concrete. The housing could also be mounted on a bottom side of the coil unit facing away from the roadway, so that the electronics contained in the supply unit are at a sufficient distance from the coil.

Advantageously, a shaft module could also be provided with an inner space that is defined by a shaft floor and a surrounding shaft wall and is open toward the roadway, and is advantageously prefabricated and can be merely submerged in a corresponding opening in the ground at the installation site. To be able to easily and quickly close the inner space of the shaft module, the coil unit can be preferably used. The shaft wall can also advantageously have on its upper end a surrounding projection that points toward the inner space and on which the coil unit can be placed. Preferably, a roadway side of the coil unit and the other end of the shaft wall can be closed flush with each other and with the roadway in the installed state, in order to be able to provide as seamless a roadway as is possible.

Advantageously, the coil could be arranged together with the supply unit in the housing. Here, a housing cover pointing toward the roadway could be formed as part of the roadway, which enables a compact configuration and simple installation on-site.

BRIEF DESCRIPTION OF THE DRAWINGS

Below, an embodiment of the invention is described in detail using the accompanying drawings. Shown are FIG. 1 a schematic side view through a device according to the invention for inductive transfer of electrical energy in the normal operating state;

FIG. 2 the view from FIG. 1 with some water penetrating into the device;

FIG. 3 the view from FIG. 1 with more water penetrating into the device;

FIG. 4 the view from FIG. 1 with a large amount of water penetrating into the device;

FIG. 5 an alternative housing shape of a housing of the device according to the invention from FIG. 1;

FIG. 6 another alternative housing shape of a housing of the device according to the invention from FIG. 1.

DETAILED DESCRIPTION OF THE INVENTION

FIG. 1 shows a device 1 according to the invention for the inductive transfer of electrical energy. The device 1 has a shaft module 3 that is prefabricated from steel-reinforced concrete and is completely submerged in the ground 2 with an inner space 6 that is defined by a shaft floor 4 and a surrounding shaft wall 5, and is initially open toward the roadway 7. On its upper end, the shaft wall 5 has a surrounding projection 8 pointing toward the inner space 6.

A coil unit 9 with an edge region of its bottom side 10 is placed on the projection 8 and connected detachably to the shaft wall 5. The coil unit 9 therefore closes the inner space 6 relative to the roadway 7. A roadway side 11 of the coil unit 9 and the upper end of the shaft wall 5 close flush with the roadway 7.

In the coil unit 5, a primary coil 12 for the inductive transfer of electrical energy to a secondary coil 13 of an electric vehicle 14 is integrated in a known way. The primary coil 12 is supplied with electrical energy via a supply cable 15 from a known electrical supply unit 16.

The supply unit 16 contains a converter for preparing the high voltages and currents for the energy transfer from primary coil 12 to secondary coil 13, and control electronics for controlling the converter. The supply unit 16 itself is connected to the local energy supply grid via a power grid cable 17. Here, the power grid cable 17 is guided through a cable bushing 18 provided in the shaft wall 5. To prevent the penetration of water through the cable bushing 18 into the inner space 6, the cable bushing 18 is provided with a seal, not shown.

As described in the introduction, however, such seals always have the risk that the seal will fail for a wide range of reasons, or the sealing effect will degrade so much that water will penetrate into the inner space 6.

To nevertheless guarantee a safe and reliable operation of the device 1 in the event of water penetration and, in particular, to protect the moisture-sensitive supply unit 16 from water, the invention provides to mount the supply unit 16 in a pot-shaped housing 19 with housing opening 20 pointing downward on the coil unit 9.

Here, the housing 19 with a housing cover 21 is mounted on the bottom side 10 of the coil unit 9 and the supply unit 16 is, in turn, mounted on a cover bottom side 22 of the housing 19. A surrounding housing wall 23 extends from the housing cover 21 to the shaft floor 4, wherein the housing wall 23 is at a distance from the shaft floor 4 so that there is still passage for the supply cable 15 and the power grid cable 17. The housing wall 23 is here significantly higher than the supply unit 16. Thus, there is always a safety margin S between the housing opening 20 and a bottom side of the supply unit 16. In the present case, the housing wall 23 is somewhat more than twice as high as the supply unit 16, so that a distance H between the housing opening 20 and housing cover 21 is approximately twice as large as the safety margin S.

To shield the electronics contained in the supply unit 16 from the strong magnetic field of the primary coil 12, the housing 19 can be preferably made from a material that is a good electrical conductor, for example, aluminum.

As can be seen from FIGS. 2-4, the invention uses the so-called diving bell principle for protecting the supply unit 16 and its especially moisture-sensitive electrical and electronic components.

In this way, the housing 19 that is airtight and watertight at the top prevents water that penetrates into the inner space 6 from rising in the housing 19 up to the supply unit 16.

If water 24 penetrates into the inner space 6, initially a water level 25 is formed as shown in FIG. 2. If the water 24 continues to rise, then it gradually reaches up to the housing opening 20 of the housing 19, wherein, at least at the beginning, the water level 25 outside of the housing 19 corresponds to a water level 26 in the housing 19, as shown in FIG. 3. If the water 24 rises more, the water 24 can no longer rise as far inside the housing 19 as outside the housing 19, due to the air present in the airtight and watertight housing 19, so that the water level 26 in the housing 19 remains lower than the water level 25 in the inner space 6 outside the housing 19. As soon as equilibrium has been reached between the pressure of the compressed air in the housing 19 and the pressure of the water 24 in the shaft module 3, the water level 26 in the housing no longer rises, as shown in FIG. 4. Thus, even if the entire inner space 6 is flooded with water 24, the water 24 does not rise up to the supply unit 16.

Preferably, in the area outside the housing 19, a ventilation device can be provided through which the air, displaced by the water 24 when the water level 25 rises outside the housing, can escape from the inner space 6. For example, the coil unit 9 has a one-way valve 27 that allows air and optionally also water 24 to escape from the inner space 6, but does not permit air or water to penetrate into the inner space 6 in the opposite direction. Also, a not-shown, closeable exhaust opening can be provided in the device 1 to be able to easily suction, from the outside, water present in the inner space 6 of the shaft module 3. For example, a closeable round hole above the inner space 6 outside of the housing cover 21 could be provided in the coil unit 9, by means of which a hose can be inserted into the inner space.

FIG. 5 shows the device according to the invention from FIG. 1 with a housing 19' with another alternative housing shape. Identical parts as in the design shown in FIG. 1 are provided with identical designations and given identical reference symbols. A housing wall 23' narrows from the housing cover 21 toward the housing opening 20', so that the housing wall 23' continuously narrows toward the housing opening 20'. In this way, the level of penetrating water rises more and more slowly, because the space of the housing 19" increases continuously with height.

In FIG. 6, the device according to the invention from FIG. 1 is shown with a housing 19" with another alternative housing shape. Identical parts as in the design shown in FIG. 1 are provided with identical designations and given identical reference symbols. A housing wall 23" initially runs at a right angle from the housing cover 21 in the direction of a housing opening 20" and then bends inward at approximately half the distance H, so that the housing wall 23" narrows toward the housing opening 20". In this way, the level of penetrating water rises more and more slowly, because the space of the housing 19" increases continuously with height. Compared to the housing 19' shown in FIG. 5, the housing 19" according to FIG. 6 has the advantage that a wider supply unit 16 can also be used.

Through the construction described above, the penetration of water 24 into the supply unit 16 is prevented in a way that is completely unexpected for someone skilled in the art. This is because great efforts are typically taken to enclose the sensitive electrical and electronic parts of a supply unit as well as possible from the penetration of water or other fluids and to seal the housing that surrounds the supply unit 16 as well as possible. In the invention, however, a best-possible leak-tight encapsulation of the supply unit 16 can be largely eliminated. This is in clear contradiction to the otherwise prevalent opinion of those skilled in the art.

REFERENCE SYMBOLS

1 Device for inductive transfer of electrical energy
2 Ground
3 Shaft module
4 Shaft floor
5 Shaft wall
6 Inner space
7 Roadway
8 Projection
9 Coil unit
10 Bottom side of the coil unit
11 Roadway side of the coil unit
12 Primary coil
13 Secondary coil
14 Electric vehicle
15 Supply cable
16 Supply unit
17 Power grid cable
18 Cable bushing
19 Housing
19' Housing with alternative housing shape
19" Housing with another alternative housing shape
20 Housing opening
20' Housing opening of the alternative housing shape
20" Housing opening of the other alternative housing shape
21 Housing cover
22 Cover bottom side
23 Housing wall
23' Housing wall of the alternative housing shape
23" Housing wall of the other alternative housing shape
24 Water
25 Water level
26 Water level in the housing
27 Ventilation valve
H Distance of cover bottom side to housing opening
S Safety margin

The invention claimed is:

1. A device for the inductive transfer of electrical energy between a stationary coil that can be installed in a roadway and a secondary coil of a movable electrical load, the device comprising:
a housing that is closed on top and laterally, having a housing opening that is open to the bottom;
the stationary coil; and
a supply unit for supplying electrical energy, the supply unit being coupled to the stationary coil,
wherein the housing includes a surrounding housing wall, and a housing cover attached to the surrounding housing wall, and
the supply unit is arranged on a side of the stationary coil facing away from the roadway in an installed state in the housing that is closed on top and laterally, the supply unit being attached to a bottom side of the housing cover, and the housing cover being mounted on a bottom side of the stationary coil.

2. The device according to claim 1, wherein the supply unit is arranged in the height direction with a safety margin above the housing opening in the housing.

3. The device according to claim 2, wherein the safety margin is at least half as high as a distance between the housing opening and the housing cover of the housing lying opposite the housing opening.

4. The device according to claim 1, wherein the housing has the shape of a hollow cylinder that is closed on one side.

5. The device according to claim 1, wherein the housing is made from an electrically conductive material.

6. The device according to claim 1, wherein the housing is made from a non-corroding material.

7. The device according to claim 1, wherein the supply unit is arranged on the housing cover of the housing opposite the housing opening.

8. The device according to claim 1, wherein the stationary coil is integrated in a coil unit.

9. The device according to claim 8, wherein the housing is mounted on a bottom side of the coil unit facing away from the roadway in the installed state.

10. The device according to claim 1, further comprising a shaft module with an inner space that is open toward the roadway in the installed state, the shaft module being defined by a shaft floor and a surrounding shaft wall.

11. The device according to claim 10, wherein the shaft wall has, on its upper end, a surrounding projection pointing toward the inner space.

12. The device according to claim 11,
wherein the shaft module is prefabricated from steel-reinforced concrete and is completely submerged in the ground in the installed state, the stationary coil is integrated in a coil unit and the inner space of the shaft module is closed by the coil unit, and the surrounding housing wall extends from the housing cover towards the shaft floor, but is at a distance from the shaft floor.

13. The device according to claim 12, wherein a roadway side of the coil unit and the upper end of the shaft wall are closed flush with each other.

14. The device according to claim 1, wherein the secondary coil is in an electric vehicle.

15. The device according to claim 1, wherein the stationary coil is integrated in a coil unit, and the housing cover is mounted on a bottom side of the coil unit facing away from the roadway in the installed state.

16. The device according to claim 1, further comprising:

a shaft module with an inner space that is open toward the roadway in the installed state, the shaft module being defined by a shaft floor and a surrounding shaft wall, wherein the stationary coil is integrated in a coil unit and the inner space of the shaft module is closed by the coil unit, and the housing cover is mounted on a bottom side of the coil unit facing away from the roadway in the installed state.

17. A device for the inductive transfer of electrical energy between a stationary coil that can be installed in a roadway and a secondary coil of a movable electrical load, the device comprising:

a housing that is closed on top and laterally, having a housing opening that is open to the bottom;

the stationary coil; and a supply unit for supplying electrical energy, the supply unit being coupled to the stationary coil, wherein the supply unit is arranged on a side of the stationary coil facing away from the roadway in an installed state in the housing that is closed on top and laterally, and a side housing wall of the housing narrows at least in some sections toward the housing opening.

18. A device for the inductive transfer of electrical energy between a stationary coil that can be installed in a roadway and a secondary coil of a movable electrical load, the device comprising:

a housing that is closed on top and laterally, having a housing opening that is open to the bottom;

the stationary coil; and a supply unit for supplying electrical energy, the supply unit being coupled to the stationary coil, wherein the supply unit is arranged on a side of the stationary coil facing away from the roadway in an installed state in the housing that is closed on top and laterally, and the housing has the shape of a hollow conical section that is closed on one side, wherein the smaller side of the hollow cone forms the housing opening.

19. A device for the inductive transfer of electrical energy between a stationary coil that can be installed in a roadway and a secondary coil of a movable electrical load, the device comprising:

a housing that is closed on top and laterally, having a housing opening that is open to the bottom;

the stationary coil; and a supply unit for supplying electrical energy, the supply unit being coupled to the stationary coil, wherein the supply unit is arranged on a side of the stationary coil facing away from the roadway in an installed state in the housing that is closed on top and laterally, and a ventilation device is provided outside of the housing for venting an inner space of the device.

20. A device for the inductive transfer of electrical energy between a stationary coil that can be installed in a roadway and a secondary coil of a movable electrical load, the device comprising:

a housing that is closed on top and laterally, having a housing opening that is open to the bottom;

the stationary coil; and a supply unit for supplying electrical energy, the supply unit being coupled to the stationary coil, wherein the supply unit is arranged on a side of the stationary coil facing away from the roadway in an installed state in the housing that is closed on top and laterally, and an exhaust opening is provided outside of the housing for removing water from an inner space of the device.

* * * * *